United States Patent
Kapaan

[11] 3,949,632
[45] Apr. 13, 1976

[54] TUBE CUT-OFF MACHINE
[75] Inventor: Hendrikus Jan Kappan, Jutphaas, Netherlands
[73] Assignee: SKF Industrial Trading and Development Company, B.V., Jutphaas, Netherlands
[22] Filed: June 25, 1974
[21] Appl. No.: 482,909

[30] Foreign Application Priority Data
June 27, 1973 Netherlands.................... 7308911

[52] U.S. Cl. .................... 83/188; 83/54; 83/198
[51] Int. Cl.² .................... B26D 3/16; B23D 21/00
[58] Field of Search ........ 83/54, 196, 198, 188, 189

[56] References Cited
UNITED STATES PATENTS

| | | | |
|---|---|---|---|
| 2,404,901 | 7/1946 | Cibs .............................. | 83/189 X |
| 2,412,930 | 12/1946 | Walklet .......................... | 83/189 X |
| 2,428,540 | 10/1947 | Babbitt et al. ................ | 83/189 X |
| 3,750,505 | 8/1973 | Organ et al. ................... | 83/54 |

Primary Examiner—Willie G. Abercrombie
Attorney, Agent, or Firm—Daniel M. Rosen

[57] ABSTRACT

A method of cropping profile material, such as a tube, to a certain width which material is moved to a cropping mechanism by means of a feeding mechanism, the end portion of the profile material or the tube is fed into the cropping mechanism to a certain width and fixed therein, after which the cropping mechanism of the device is displaced crosswise to the feeding mechanism, whereby a tube or portion of the profile material is cropped off during which a divisible supporting member or mandrel omnilaterally fitting the portion or tube until the said cropped-off portion is ejected from the moving cropping mechanism, characterized in that the divisible elements of the supporting member or mandrel adhere together during cropping-off the portion of the profile material or tube, such that the adhesive effect between the elements proportionally decreases at the rate the cropping operation progresses and wherein the cropped off part being positively pressed mainly in axial direction.

11 Claims, 1 Drawing Figure

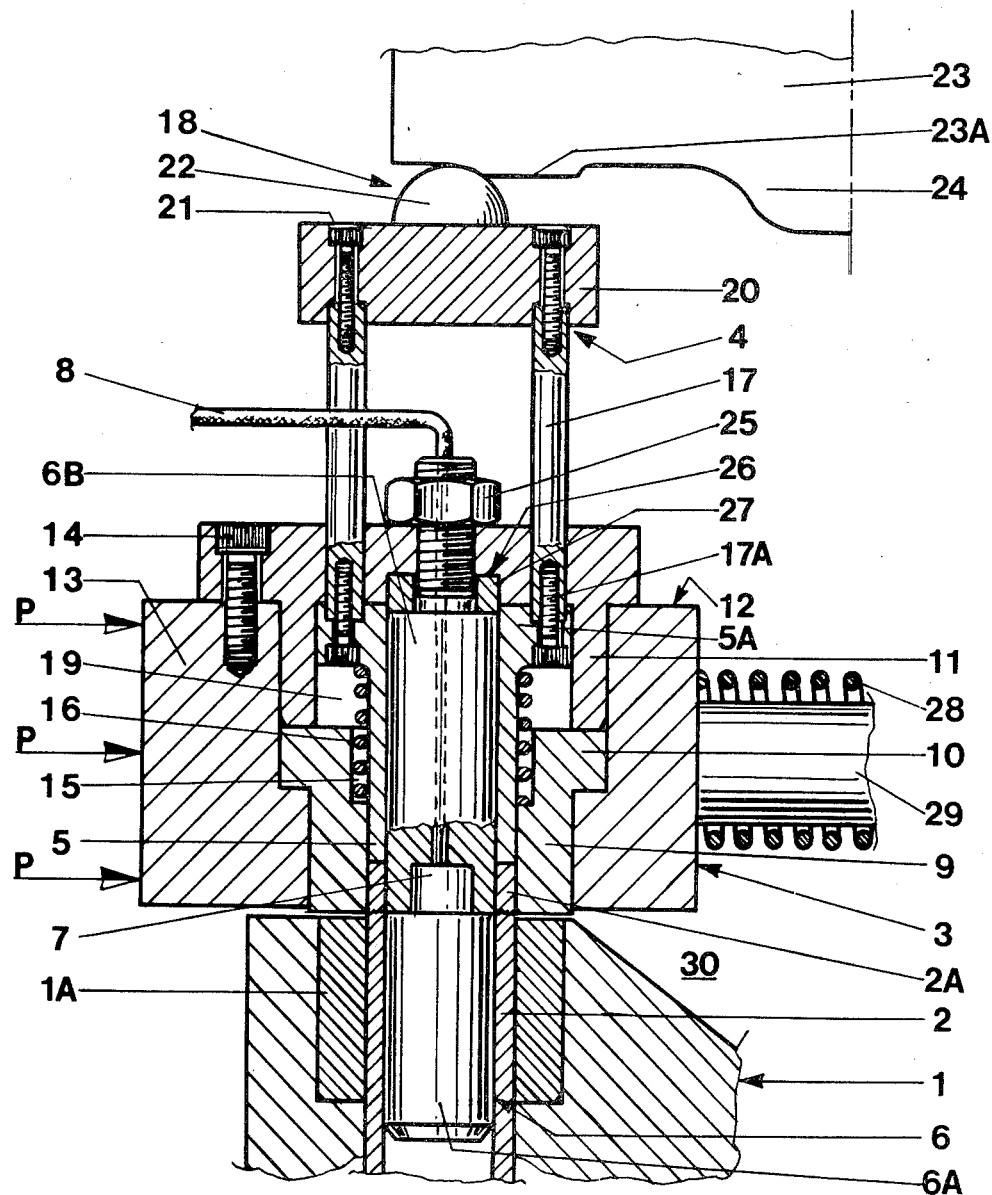

TUBE CUT-OFF MACHINE

The invention concerns a method and a device applied to such method for cropping to a certain width profile material, e.g. a tube, the said material being fed into a cropping mechanism by means of a feeding mechanism. The end portion of the profile material or a tube is fed into the cropping mechanism to a certain depth and fixed therein, and then the cropping mechanism of the device is displaced crosswise to the feeding mechanism, whereby a tube or a portion of the profile material is cropped off, during which a divisible member or mandrel, omnilaterally fitting the portion of the tube or profile until the said cropped-off portion is ejected from the moving cropping mechanism. Such a method and device is disclosed e.g. in the U.S. patent specification 2.412.930. It has, however, not been possible hitherto to effect the cropping off of profile material such that the end parts and the cropped off parts not show deformations. This imperfection is due to the fact that, for instance, during the cropping or cutting off operation the profile material, that is the tube, is not sufficiently supported both in radially and axially direction.

The invention now introduces a method which is characterized in that the divisible elements of the supporting member or mandrel adhere together during cropping-off of the portion of the profile material or tube such that the adhesive effect between the elements proportionally decreases at the rate the cropping operation progresses, the cropped off part being positively pressed mainly in axial direction. This method provides an efficient and cost-saving process for forming parts of profile material, whereby no supplementary treatments will be necessary. In addition, the proposed process permits considerable saving in material. Deformations or other irregularities of the bords or side-edges of the cropped or sheared portions are eliminated, thereby preventing material losses as a rule caused by additional treatments (e.g. grinding).

A device, preferably applied to carry out the process according to the invention, comprises a feeding mechanism for profile material, a cropping mechanism and means with the aid of which a portion of the profile material or a tube can be introduced to a certain depth into the cropping mechanism and fixed therein. Also, means are provided for displacing the cropping mechanism crosswise to the feeding mechanism while a supporting member or mandrel is applied, which omnilaterally supports the portions of tubes or profile material, at least during cropping. The invention is characterized in that a control mechanism is applied, working together with said cropping off mechanism and wherein at least said cropped off portion can be removed from the cropping mechanism by means of a control mechanism working together with said cropping-off mechanism. At least during the cropping-off process, the splitable or divisible elements of the supporting member remain connected and are under the effect of proportionally decreasing adhesive action at least during cropping. Means are arranged which positively press said cropping off part, mainly in the axial direction. Such arrangement permits the construction of a compact and rather simple device, while achieving a high degree of accuracy upon the supporting member execution into two parts which, during the cropping off operation under proportionally decreasing adhesive action, will be splitted. According to a preferable embodiment of the invention the cropping mechanism comprises a control mechanism of which one end portion presses against the portion of the profile material or tube, the other end portion being provided with a cam which slides along a cam disc during cropping-off, the pattern of said disc being adapted to the ejection cycle of the cropping mechanism.

A special feature of the invention is the economical solution of the problem of additional treatments and material losses of cropped off profile material such as a tube-portion, mainly in case high-quality steel is being used. This kind of steel is frequently applied to machine parts, e.g. bearing-rings which are made of such high-quality material.

The invention will be described in detail with reference to an exemplary embodiment thereof, revealing advantages and other features of the invention.

The device, which is schematically represented in the FIGURE, essentially comprises a feeding mechanism 1 feeding the profile material 2 to be processed, and a cropping mechanism 3 provided with a control mechanism 4. In the described embodiment the material fed in consists of a hollow tube 2, the end portion 2A thereof being inserted into the mechanism 3 of the device. The depth of insertion is determined by a tubular or cylindrical limit stop 5 forming a part of the control mechanism 4. A supporting member or a mandrel 6 fits with a slight clearance into the tube 2 and the limit stop 5. The supporting member or mandrel comprises two separable or divisible elements 6A and 6B. The element 6A is made of a hardened magnetic material and fits, with a given clearance, in the tube 2. The element 6B is composed of a hardened material and fits, also with a certain clearance, to the limit-stop 5 and the end portion 2A of the tube 2. In addition the end portion of the element 6B adjoining the element 6A comprises a magnetic coil 7, which is energised through the connection 8. Around the limit stop 5 and tube portion 2A an attachment-member or extension 9 is arranged, made of a hard and wear-resistant material. Also part 1A of the feeding mechanism 1 which omnilaterally fits on the tube 2 is made of a hard and wear-resistant material. The extension or member 9 is further provided with a collar 10 against which butts the tube 11 of a press means 12. The extension 9 is fixed, together with the collar 10 in a frame or casing 13 by press-means 12. For this purpose the press-means 12 is fastened by adjusting screws 14 in the casing 13. Around the limit stop 5 and recess 15 of the extension 9 a spiral spring 16 is arranged, with the aid of which the limit stop 5 is pressed against the press-means 12. In the collar of the limit stop 5 slide bars 17 are mounted by means of adjusting bolts 17A, which are guided by the press-means 12 and carried by a cam mechanism 18.

Between the collar 5A of the limit stop 5 and the collar 10 of the attachment member 9 a space 19 is formed the width of which, between both collars 5A and 10, is larger than the depth of insertion of the end portion 2A of the tube. The cam mechanism 18 which is in connection with the slide bars 17 comprises a disc 20 connected to the bars 17 by means of adjusting bolts 21. The cam mechanism, in addition, displays a cam 22 which is pressed against a disc 23 under the effect of the spring 16. The disc 23 is provided with a pattern 23A and comprises at its lower side an upward directed part 24, the height thereof being at least equal to the axial distance between both collars 5A and 10 in the space 19. Due to the special shape of the disc 23 it can advantageously be realised that, during the motion of the cam 22 along the disc part 23A, the limit stop 5 is positively pressed to the portion 2A to be cropped off from the tube 2. The press-means 12 further comprises an adjusting bolt 25 provided with an opening for the electric wire 8 and an aperture 26, wherein an adjusting ring 27 for the correct positioning of the member or mandrel part 6B in the mechanism 3 is mounted. At the lower side of the casing or framework 13 a plunger 29 is arranged, provided with a spiral spring 28. Such an arrangement ensures a resilient support of the cropping mechanism 3 in vertical direction, i.e. after each downward motion and after a certain period the mechanism 3 returns into its initial position.

The device functions in the following manner. The tubular material 2 to be processed, e.g. cropped to a given width, is guided from the left side of the figure by the feeding mechanism 1 towards the cropping mechanism 3. This can be effected, for example, by a hydraulic drive and control. When in operative position the feeding mechanism 1 supporting and guiding the tube 2 reclines against the attachment-member or extension 9 of the cropping mechanism 3, while the mandrel element 6A abuts against the mandrel element 6B. At the same time the tube portion 2A slips between the attachment-member 9 and the element 6B, until the tube portion contacts the limit stop 5. At this moment the coil 7 of the element 6B is energised, due to which the magnetic mandrel element 6A will adhere to the element 6B. It has to be pointed out that, by replacing the limit stop 5 by another one, the width of the tube portion 2A can be modified. After the tube portion 2A has been fixed in the mechanism 3, a downward directed force (according to the arrows P) will be applied to the said mechanism at a given speed, on account of which the annular end portion 2A of the tube 2 will be cut off or cropped-off. Since during this process the entire cutting or cropping surfaces of the portions 2 and 2A are supported such support being maintained also during the cropping action proper and since the portion 2A to be cropped remains under positive pressure, due to the action of the cam mechanism 18 which during said process moves along the pattern 23A, no deformations or irregularities will occur on the edges or sidefaces of the tube portion 2A.

It is evident that the special way of support of the tube portions 2 and 2A, effected from the start of the cropping operation until the completion thereof, whereby the mandrel element 6A and 6B adhere to one another with a gradually reducing adhesive force, provides an important contribution to the solution of the forementioned problem.

After the tube portion 2A has been sheared respectively cropped off from the tube 2, this portion will be positioned within a very short period of time before a space 30 between the feeding mechanism 1 and the cropping mechanism 3. During the downward motion of the mechanism 3 the cam 22 of the control mechanism 4 will be displaced as well along the surface of the disc 23 and will be positioned, at a given moment, at the height of the upwards directed part 24 of the cam disc 23. During the further displacement of the cam 22, the said cam will run against the upward directed part 24, thereby displacing the control mechanism 18 and the limit stop 5 connected therewith in axial direction (from right to left in the FIGURE), due to which the tube portion 2A, freely positioned before the space 30, will be ejected from the mechanism 3. At the same time, while the cam 22 is moved on the part 24 of the cam disc 23, the magnetic coil 7 is de-energised, and consequently, during the axial displacement of the control mechanism 4, the cropped-off tube portion 2A will be completely separated from the accompanying mandrel element 6B. After the cropping mechanism arrived at its lowest position, it will be moved upwards by the increasing tension of the spring 28 and due to the weakening of the force P, so that the following operational cycle can be started.

The invention is not limited to the described and represented embodiment, since it can also be applied to devices, wherein the adherence of the element 6A and 6B during the cropping of a profile portion is affected by hydraulic, mechanical or pneumatic means instead of an electro-magnetic system.

I claim:
1. In an apparatus for cropping material of the type comprising a cropping member having a recess, a feeding member for feeding material to be cropped into said recess, said cropping member being slidable with respect to said feeding member for shearing said material, means in said cropping member for limiting the depth of insertion of said material therein, and a mandrel for continuously internally supporting said material; the improvement wherein said mandrel comprises a first mandrel member fixedly held in said cropping member and a second mandrel member in said feeding member, means for holding said first and second mandrel members together with proportionally decreasing force as said cropping member slides with respect to said feeding member to shear said material, and further comprising means dependent upon the relative positions of said cropping means and feeding means for moving said limiting means into said recess for ejecting cropped material in said recess when said recess is moved out of alignment with respect to said material held in said feeding means.

2. The apparatus of claim 1, wherein said second mandrel member is freely axially movable in said feeding member.

3. The apparatus of claim 2, wherein said means for holding said first and second mandrel members together comprises electromagnet means, whereby holding forces attracting said first and second mandrel members together decreases as said cropping member is slid with respect to said feeding member.

4. The apparatus of claim 3, wherein said electromagnet is positioned in said first mandrel member adjacent said second mandrel member.

5. The apparatus of claim 1, wherein said means for ejecting cropped material comprises a cam surface fixed with respect to said feeding member, and control means extending between said cam surface and said limiting means for controlling the axial position of said limiting means in said recess.

6. The apparatus of claim 5, comprising spring means positioned to resiliently urge said limiting means toward said cam surface, thereby urging said control means toward said cam surface.

7. The apparatus of claim 6, wherein said limiting means comprises a sleeve slidably surrounding said first mandrel member, and said control means comprises bar means connected to said sleeve and extending through said cropping member, and means engaging said cam surface for controlling the axial position of said sleeve and said cropping member.

8. The apparatus of claim 1, wherein said limiting means comprises a sleeve surrounding said first mandrel member, said cropping member having an annular chamber surrounding said sleeve, said sleeve having a flange extending into said chamber, spring means in said chamber for urging said sleeve away from said feeding member, said chamber having an axial dimension at least equal to the length of material to be cropped, and wherein said means for ejecting comprises a cam surface held in a fixed position with respect to said feeding member, and control means extending between said cam surface and said sleeve.

9. The apparatus of claim 8, wherein said cam surface is positioned spaced from the side of said cropping member away from said feeding member, said control means comprising bar means slidably extending through said cropping member and affixed to said sleeve, and means affixed to said bar means for engaging said cam surface.

10. The apparatus of claim 9, wherein said cam surface has a pattern for positively pressing a cropped off portion of said material in said cropping member against said feeding member until just before said sleeve is moved into said recess.

11. The apparatus of claim 1, comprising a spring mounting for said cropping member.

* * * * *

UNITED STATES PATENT AND TRADEMARK OFFICE
CERTIFICATE OF CORRECTION

PATENT NO. : 3,949,632
DATED : April 13, 1976
INVENTOR(S) : Hendrikus Jan Kapaan It is certified that error appears in the above-identified patent and that said Letters Patent are hereby corrected as shown below:

Inventor's name was incorrectly spelled and should read Kapaan.

Column 2, line 1, sentence beginning with "According to a" should start a new paragraph.

Signed and Sealed this

Twenty-sixth Day of October 1976

[SEAL]

Attest:

RUTH C. MASON
Attesting Officer

C. MARSHALL DANN
Commissioner of Patents and Trademarks